US012056328B2

(12) United States Patent
Taylor et al.

(10) Patent No.: US 12,056,328 B2
(45) Date of Patent: Aug. 6, 2024

(54) VISUALIZATION

(71) Applicant: Angel Studios, Inc., Provo, UT (US)

(72) Inventors: Seth Taylor, Provo, UT (US); Ajay Madhok, Provo, UT (US); Jedadiah Ashford, Provo, UT (US); Bartlomiej Weresniak, Provo, UT (US)

(*) Notice: Subject to any disclaimer, the term of this patent is extended or adjusted under 35 U.S.C. 154(b) by 0 days.

(21) Appl. No.: 17/964,024

(22) Filed: Oct. 11, 2022

(65) Prior Publication Data

US 2023/0289029 A1    Sep. 14, 2023

Related U.S. Application Data

(60) Provisional application No. 63/254,499, filed on Oct. 11, 2021.

(51) Int. Cl.
*G06F 3/04815* (2022.01)
*G06F 3/048* (2013.01)
*G06T 15/20* (2011.01)

(52) U.S. Cl.
CPC .......... *G06F 3/04815* (2013.01); *G06T 15/20* (2013.01)

(58) Field of Classification Search
CPC ............................ G06F 3/04815; G06T 15/20
USPC ........................................................ 715/848
See application file for complete search history.

(56) References Cited

U.S. PATENT DOCUMENTS

| | | | |
|---|---|---|---|
| 6,448,964 B1* | 9/2002 | Isaacs | G06F 3/04845 345/419 |
| 8,487,926 B2* | 7/2013 | Lee | G06T 3/4038 345/419 |
| 9,058,679 B2* | 6/2015 | Mielekamp | G06T 15/08 |
| 9,116,666 B2* | 8/2015 | Salter | G06F 3/017 |
| 9,324,188 B1* | 4/2016 | Fram | G06F 3/0412 |
| 9,407,904 B2* | 8/2016 | Sandrew | H04N 13/271 |
| 2009/0058806 A1* | 3/2009 | Middler | G06F 3/0481 345/157 |
| 2013/0120367 A1* | 5/2013 | Miller | G06T 19/00 345/419 |
| 2017/0287230 A1* | 10/2017 | Gortler | G06F 3/04845 |
| 2020/0319776 A1* | 10/2020 | Natzke | G06F 3/0488 |
| 2023/0080133 A1* | 3/2023 | Meier | G08G 1/165 |

OTHER PUBLICATIONS

Camille MCG, Holographic Flash Card—NFT Template, published Oct. 18, 2021 waybackmachine, pp. 1-2 (pdf).*

* cited by examiner

*Primary Examiner* — Manglesh M Patel
(74) *Attorney, Agent, or Firm* — Shapiro IP Law; Joseph Shapiro

(57) ABSTRACT

An electronic/virtual visualization may comprise a rotatable two-sided object, similar in some respects to a card from the physical world. Each side of the electronic visualization object may comprise a flat or substantially flat face, which may comprise both a 2d (two-dimensional) area and a 3d (three-dimensional) window/frame area. The 3d window area may show a representation of a 3d object or scene, thereby giving the appearance that the 3d window area has depth behind the card object.

6 Claims, 12 Drawing Sheets

VISUALIZATION

BACKGROUND OF THE INVENTION

Computers, electronic displays, and similar devices provide many ways of visualizing items, people, landscapes, concepts, and ideas.

In some applications it is useful for a computer system to combine, in the same visualization, elements of real-world visualization with visualization elements that are uncommon or impossible in the real world. This approach may allow a user/viewer to appreciate how to perceive or interact with a visualization based on an immediate familiarity with the real-world aspects, while at the same time also enhancing the visualization with non-real-world elements.

Innovative visualizations that exploit the capabilities of computers, electronic displays, and similar systems may enhance user experiences in viewing and perceiving visualizations.

BRIEF SUMMARY OF THE INVENTION

DETAILED DESCRIPTION OF THE INVENTION

This application claims priority to U.S. Provisional Application No. 63/254,499, titled "Visualization," and filed on Oct. 11, 2021, and which is incorporated herein by reference in its entirety.

A system and method are disclosed for generating a displaying a novel 2d/3d hybrid visualization.

Table of Reference Numbers from Drawings:

The following table is for convenience only, and should not be construed to supersede any potentially inconsistent disclosure herein.

| Reference Number | Description |
| --- | --- |
| 100 | visualization |
| 105 | Rotatable object |
| 110 | First side |
| 120 | 2d area of first side |
| 130 | 3d window/area of first side |
| 135 | 3d object in 3d window/area of first side |
| 140 | Second side |
| 150 | 2d area of second side |
| 160 | 3d window/area of second side |
| 165 | 3d object in 3d window/area of second side |
| 170 | Media player |

Figure 1A:
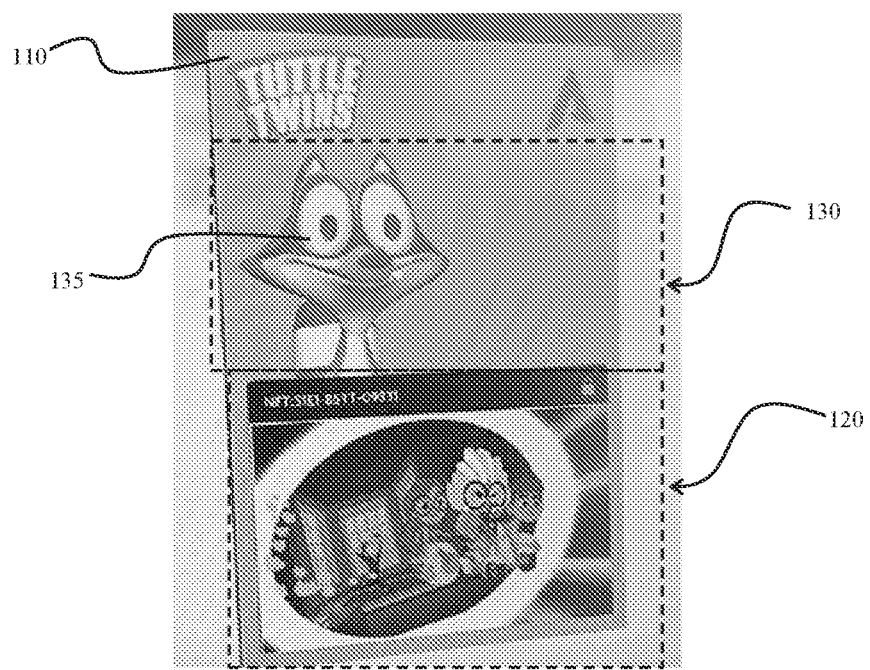
FIG. 1A shows an exemplary visualization at a first, or initial, rotational orientation.
Figure 1B:
FIG. 1B shows the exemplary visualization at a rotational orientation that is rotationally offset from the previous figure.
Figure 1C:
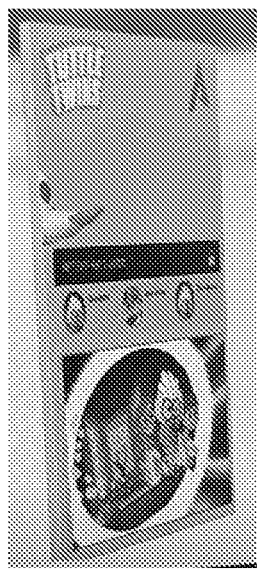
FIG. 1C shows the exemplary visualization at a rotational orientation that is rotationally offset from the previous figure.
Figure 1D:
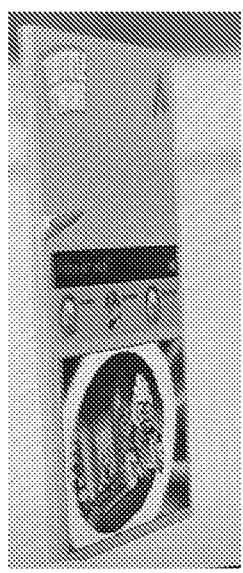
FIG. 1D shows the exemplary visualization at a rotational orientation that is rotationally offset from the previous figure.
Figure 1E:
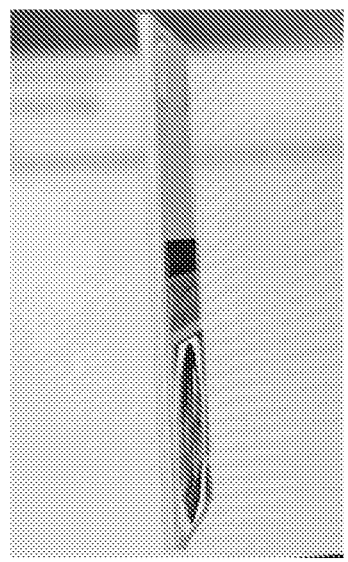
FIG. 1E shows the exemplary visualization at a rotational orientation that is rotationally offset from the previous figure.
Figure 1F:
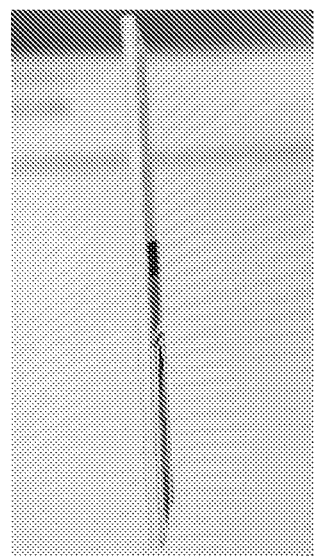
FIG. 1F shows the exemplary visualization at a rotational orientation that is rotationally offset from the previous figure.
Figure 1G:
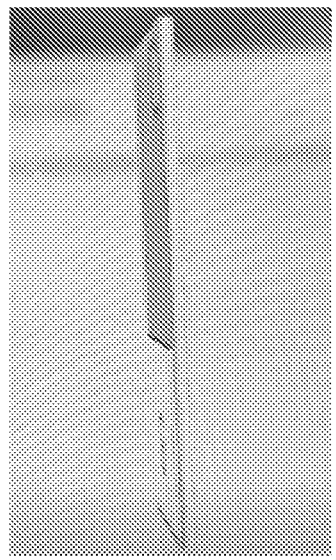
FIG. 1G shows the exemplary visualization at a rotational orientation that is rotationally offset from the previous figure.
Figure 1H:
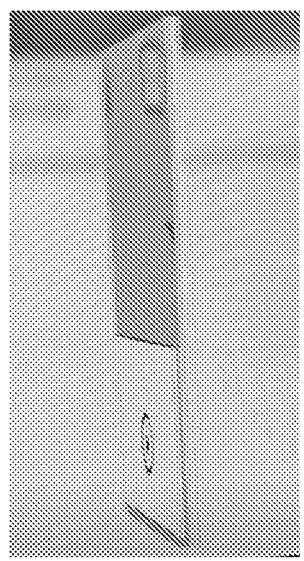
FIG. 1H shows the exemplary visualization at a rotational orientation that is rotationally offset from the previous figure.
Figure 1I:
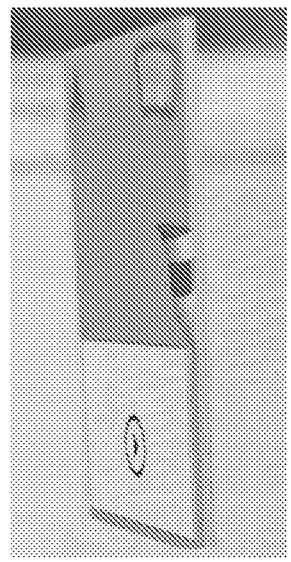
FIG. 1I shows the exemplary visualization at a rotational orientation that is rotationally offset from the previous figure.
Figure 1J:
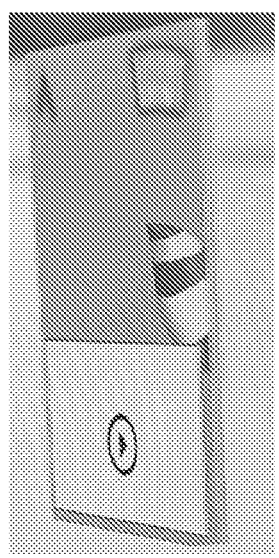
FIG. 1J shows the exemplary visualization at a rotational orientation that is rotationally offset from the previous figure.
Figure 1K:
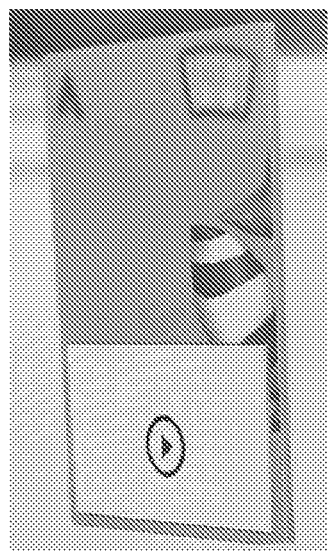
FIG. 1K shows the exemplary visualization at a rotational orientation that is rotationally offset from the previous figure.
Figure 1L:
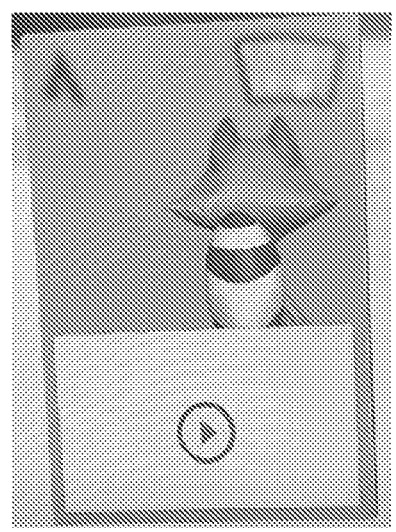
FIG. 1L shows the exemplary visualization at a rotational orientation that is rotationally offset from the previous figure.
Figure 1M:
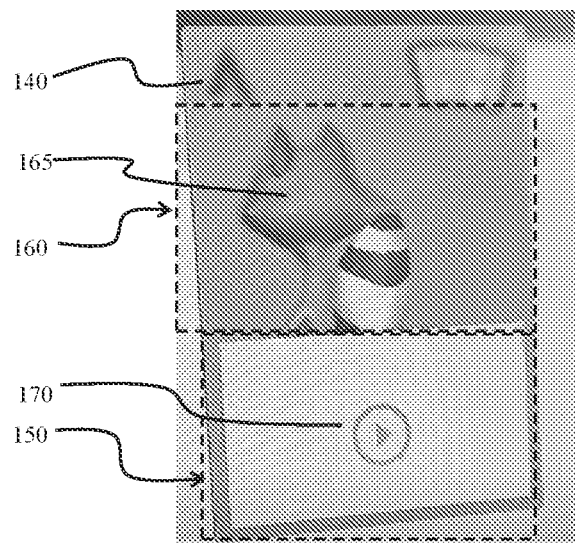
FIG. 1M shows the exemplary visualization at a rotational orientation that is rotationally offset from the previous figure.
Figure 1N:
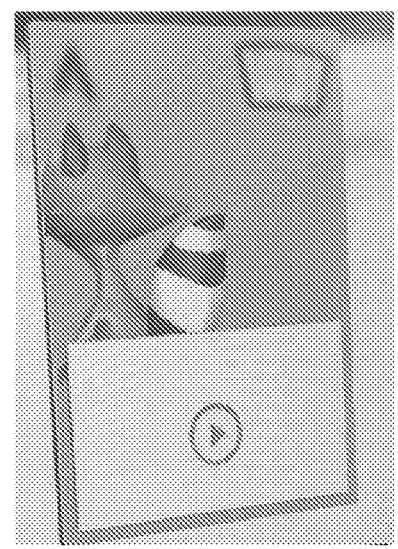
FIG. 1N shows the exemplary visualization at a rotational orientation that is rotationally offset from the previous figure.
Figure 1O:
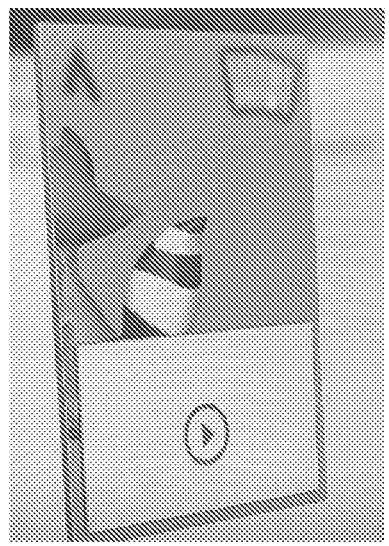
FIG. 1O shows the exemplary visualization at a rotational orientation that is rotationally offset from the previous figure.
Figure 1P:
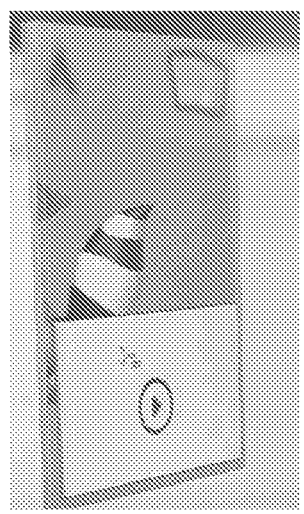
FIG. 1P shows the exemplary visualization at a rotational orientation that is rotationally offset from the previous figure.
Figure 1Q:
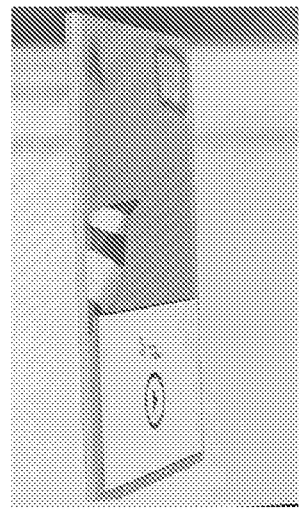
FIG. 1Q shows the exemplary visualization at a rotational orientation that is rotationally offset from the previous figure.
Figure 1R:
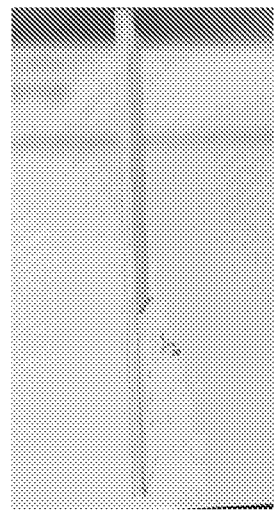
FIG. 1R shows the exemplary visualization at a rotational orientation that is rotationally offset from the previous figure.
Figure 1S:
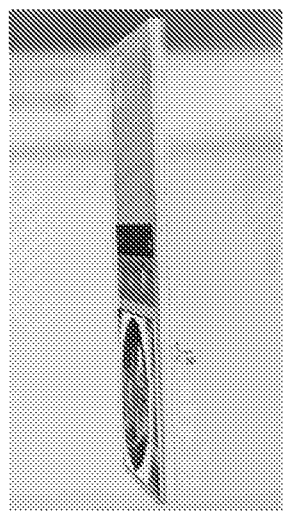
FIG. 1S shows the exemplary visualization at a rotational orientation that is rotationally offset from the previous figure.
Figure 1T:
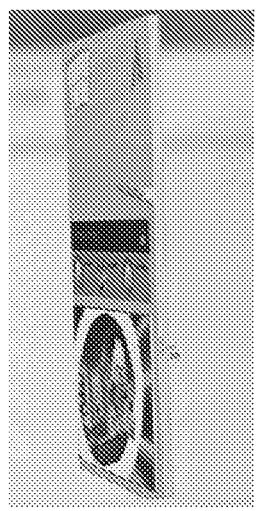
FIG. 1T shows the exemplary visualization at a rotational orientation that is rotationally offset from the previous figure.
Figure 1U:
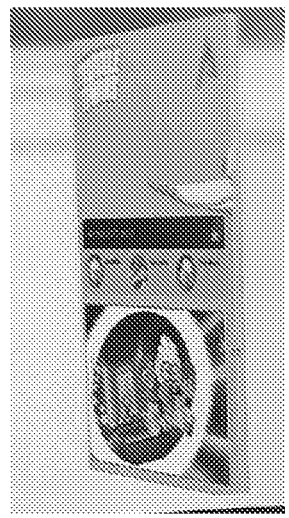
FIG. 1U shows the exemplary visualization at a rotational orientation that is rotationally offset from the previous figure.
Figure 1V:
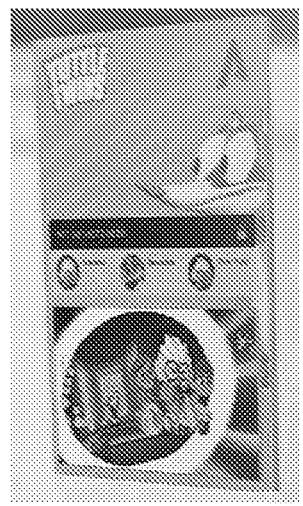
FIG. 1V shows the exemplary visualization at a rotational orientation that is rotationally offset from the previous figure.
Figure 1W:
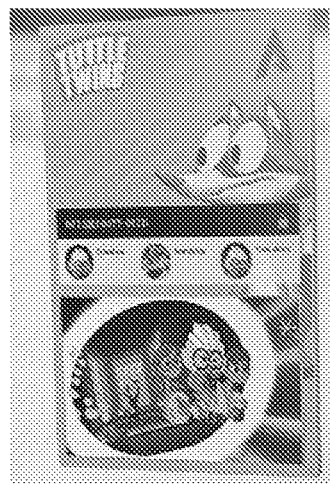
FIG. 1W shows the exemplary visualization at a rotational orientation that is rotationally offset from the previous figure.
Figure 1X:
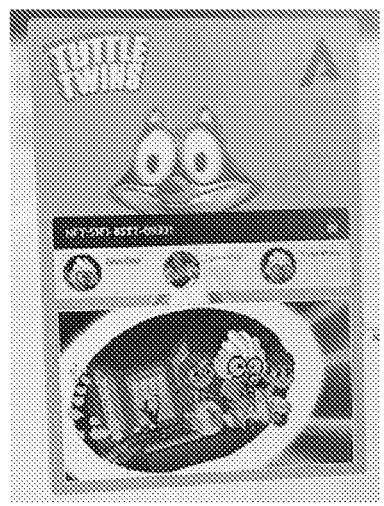
FIG. 1X shows the exemplary visualization at a rotational orientation that is rotationally offset from the previous figure.

As shown in FIGS. 1A-X, an electronic/virtual visualization 100 may comprise (i) a representation of a rotatable two-sided object 105 (e.g., card having sides 110 and 140) (or an object having at least two sides), each of the two sides comprising a flat or substantially flat face (sides 110 and 140); (ii) a 2d area 120 and 150 on each of the two sides 110 and 140 of the object; and (iii) a 3d window/frame area 130 and 160 on each of the two sides 110 and 140 of object 105.

In some embodiments, the rotatable two-sided object 105 may be similar to a card-having negligible depth/thickness. In other embodiments, the rotatable two-sided object may have non-negligible depth/thickness.

In one embodiment, 2d area 120 and/or 2d area 150 may comprise one or more images. Each image may in some instances be a frame or snapshot from a movie or video.

The 2d areas 120 and 150 on each of the two sides 110 and 140 may comprise one or more 2d interface elements and representations of one or more 2d items, which may be, e.g., a frame or snapshot from a movie or video.

The 3d window/frame areas 130 and 160 on each of the two sides 110 and 140 may comprise one or more 3d object viewers that may show a representation of a 3d object or scene 135/165 such that, as rotatable object 135/165 is rotated, the perspective of 3d object/scene 135/165 changes based on the rotation of rotatable object 135/165, thereby providing a visual sensation of 3-dimensionality of 3d object/scene 135/165. The representation of 3d object/scene 135/165 in 3d window/frame area 130 of first side 110 of rotatable object 105 may be recessed such that 3d object 135/165 does not protrude or extend past the plane comprising first side 110 of rotatable two-sided object 105. Depending on the depth of rotatable object 105, 3d object/scene 135/165 that is visible through 3d window/frame 130/160 may appear to have a depth that is greater than the depth of rotatable object 105.

The second side 140 of rotatable object 105 may be similar to first side 110.

The same 3d object/scene 135/165 that is visible through 3d object viewer 130 on first side 110 of rotatable object 105 may be visible through 3d object viewer 160 on second side 140 of rotatable object 105. In some embodiments, 3d object viewer 160 on second side 140 of rotatable object 105 may show a side 165 or perspective of 3d object/scene 135/165 that is opposite (i.e., the "back side," "other side," or "opposite side") the side/perspective 135 visible through 3d object viewer 130 on first side 110 of rotatable object 105. In other embodiments, 3d object viewer 160 on second side 140 of rotatable object 105 may show the same side/perspective 135 of 3d object/scene 135/165 that is shown on first side 110. In other embodiments, 3d object viewer 160 on second side 140 of rotatable object 105 may show a different side/perspective 165 of 3d object/scene 135/165 from that shown on first side 110.

In some embodiments, instead of using a 3d object viewer window, a 3d object may appear on the first and second sides of the rotatable object as a 3d object in/on an otherwise 2d plane/surface, i.e., the 3d object may appear on the surface in a non-recessed position or in a partially recessed position.

FIGS. 1A-X show snapshots from complete rotation of an exemplary two-sided rotatable object 105. In these exemplary snapshots, the image of the grandmother, kids, and scooter may be a 2d image 120 on first side 110, and the image of the video window 170 and play button 170 may be a 2d image 150 on second side 140. The 3d representation of the raccoon 135/165 may be visible through both first side 110 and second side 140.

In some embodiments the 2d area and 3d area of a surface, e.g., the first side or the second side, are not mutually exclusive and/or well-defined. Overlap between 2d and 3d areas could be accomplished through, e.g., partial transparency.

The visualization approach described herein is a way of mixing/combining 2d and 3d elements on the planar surfaces of a 3d polygon. But surfaces do not necessarily have to be planar, although implementation complexity increases if the surfaces are not planar. The example described herein is a simple case of a six-sided 3d polygon in which four of the sides are so thin their surface area is negligible/unusable, or are used for only 2d elements. In one embodiment, as described herein, the 3d polygon may be similar to a card. Each of the usable sides (in the example herein, two sides), is planar and includes 2d elements that remain 2d on the planar surface as the 3d polygon is rotated. Each of the usable sides (in the example herein, two sides) also includes 3d elements that, upon rotation of the 3d polygon, move/rotate as if inside a box that is significantly deeper than the depth/thickness of the edges of the "card." To slightly restate: when one of the two surfaces is visible from the exterior, (i) the visible surface is transparent to the 3d element, which moves as if it was inside a box much deeper than the apparent depth of the "card" and (ii) the interior of the other five surfaces appear as a solid-color background inside the perceived box.

The visualization described herein may be implemented in many ways on the many computer and computing systems known in the art, and using any of the screens, monitors, or other electronic visualization systems known in the art. In one embodiment, the visualization described herein may be presented through an app on a smartphone or similar device, and may be configured to rotate as the smartphone is actually physically rotated, thereby giving the smartphone the feel of a card such as a playing card or baseball card.

In some embodiments, the visualization described herein may be used to present a representation of an NFT such as an ownership interest in an NFT.

What is claimed is:

1. A method for presenting an electronic visualization, comprising:
   presenting a visual representation of an object having at least a first side and a second side, the first side comprising a first-side surface, the second side comprising a second-side surface, and the first side comprising at least a 2d object on the first-side surface and a 3d object at least partially embedded in the first-side surface;
   wherein the 2d object and the 3d object are non-protruding on the first-side surface;
   providing an interface for rotating the object;
   receiving an input direction to rotate the object;
   altering the visual representation of the object, based on the input direction, so that the object and the 2d object rotate as a planar physical object;
   altering the visual representation of the object, based on the input direction, so that from a perspective of the first side the 3d object rotates as a three-dimensional object in space, and from a perspective of the second side the 3d object rotates as if embedded in the second-side surface.

2. The method of claim 1, wherein the object is a card.

3. The method of claim 1, wherein the first-side surface comprises a planar surface and a window behind which at least part of the 3d object is situated.

4. The method of claim 3, wherein all of the 3d object is situated behind the window.

5. The method of claim 1:
   wherein the second side surface comprises a second-side planar surface and a second-side window behind which at least part of the 3d object is situated; and
   further comprising:
      receiving a second input direction to rotate the object;
      altering the visual representation of the object, based on the second input direction, so that from the perspective of the second side the 3d object rotates as a three-dimensional object in space, and from the perspective of the second side the 3d object rotates as if embedded behind the second-side window.

6. A method for presenting an electronic visualization, comprising:
   presenting a visual representation of a two-sided card comprising a first-side surface and a second-side surface, the first side comprising a 2d object on the first-side surface and a 3d object embedded behind a window in the first-side surface, wherein the 2d object and the 3d object are non-protruding on the first-side surface;
   providing an interface for rotating the object;
   receiving an input direction to rotate the object;
   altering the visual representation of the object, based on the input direction, so that the card and the 2d object rotate as a planar physical object;
   altering the visual representation of the object, based on the input direction, so that from a perspective of the first side the 3d object rotates as a three-dimensional object in space, and from a perspective of the second side the 3d object rotates as if embedded behind a window in the second-side surface.

* * * * *